Sept. 25, 1956    R. Q. ARMINGTON    2,764,208
TIRE TRACK
Filed Jan. 19, 1953                    2 Sheets-Sheet 1

INVENTOR.
Raymond Q. Armington
BY
Hyde, Meyer, Baldwin & Doran
ATTORNEYS

Sept. 25, 1956  R. Q. ARMINGTON  2,764,208
TIRE TRACK
Filed Jan. 19, 1953  2 Sheets-Sheet 2

INVENTOR.
Raymond Q. Armington
BY
Hyde, Meyer, Baldwin & Doran
ATTORNEYS

UNITED STATES PATENT OFFICE 2,764,208

TIRE TRACK

Raymond Q. Armington, Shaker Heights, Ohio, assignor, by mesne assignments, to General Motors Corporation, Detroit, Mich., a corporation of Delaware Application January 19, 1953, Serial No. 332,006

12 Claims. (Cl. 152—182)

This invention relates to improvements in a combination of a large pneumatic tire and an endless track completely surrounding and partially embracing the tire, said track comprising a plurality of rigid shoes of skeleton form with articulating connections between adjacent shoes.

One of the objects of the present invention is to provide a track of very light weight and, therefore, one which may be produced at a lower cost than a track consisting of heavy solid shoes.

Another object of the present invention is to provide an articulated track wherein the centers of the link pins are radially inside of the outside diameter of the tire casing so that the movement of the track will more closely conform to the tire movement as both tire and track flatten on the ground under load.

Another object of the present invention is to keep the overall width of the track to a minimum while at the same time keeping the overall diameter of the track to a minimum. This is done by connecting adjacent shoes with short hinge pins located on opposite sides of the tire in the space left by the curvature of the tire section. In other words, the hinge location is partially within the outside diameter of the tire and partially within the overall width of the tire.

Another object of the present invention is to provide a track shoe or cleat which consists essentially of a single bar which fits into and conforms to the shape of a groove extending crosswise of the tire tread. A preferred form of such cleat is a chevron shape which provides good traction and self-cleaning action.

A further object of the present invention is to provide an endless track embracing a tire and arranged in such a way that the track is self-cleaning due to the movement of the rubber of the tire tread between adjacent shoes or cleats.

Other objects and advantages of the present invention will be apparent from the accompany drawings and description and the essential features thereof will be set forth in the appended claims.

In the drawings,

Fig. 6 is a perspective view of one of the shoes or cleats forming the track of Figs. 1 and 5; while

Figure 1:
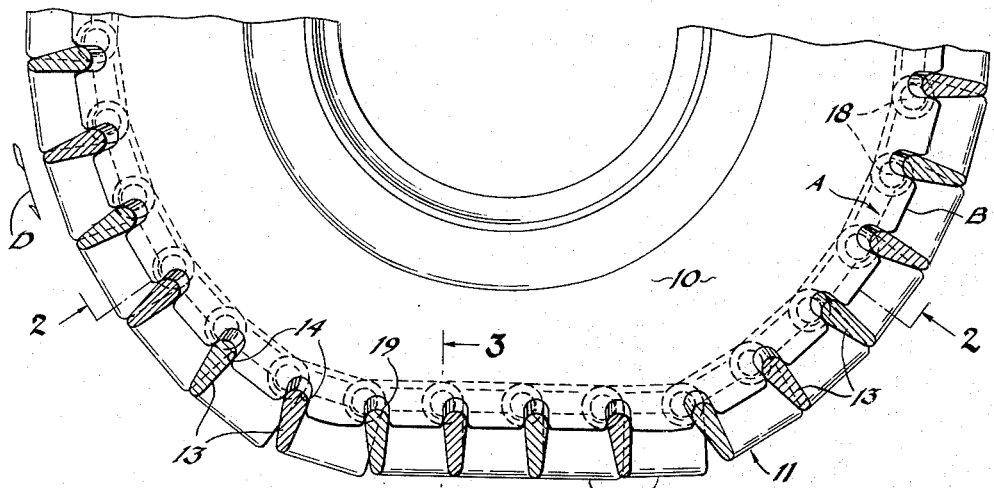
Fig. 1 is a fragmental side elevational view of a pneumatic tire with my improved endless track in position on the tire, the entire combination being under, and the track being broken away in central sectional view in order to more clearly show the cooperation between the track and the tire.

Off-the-highway vehicles use large pneumatic tires both for the purpose of carrying the load and for the purpose of floating the load on a large supporting area which is especially necessary where ground conditions are poor for supporting loads such as in sand and mud. With the increasing use of greater power for driving such vehicles, it is necessary to increase the tractive effect of such tires in order to handle the loads involved. The present invention applies to an endless track of rather open construction and consisting of a series of separate cleats surrounding the entire tread of the tire and extending slightly inwardly on the side walls of the tire so as to give a protective effect to the pneumatic tire, and at the same time to increase the tractive effect when such tires are driven in order to propel the vehicle. It is important that an endless track of this type be firmly engaged with the tire at all times so that the tire does not creep within the track and so wear away the rubber. It is also important that the track should not become loosened on the tire so that portions of the track lie down upon the ground loosely ahead of the ground-engaging-and-driving portion of the track at the bottom of the tire.

The tire illustrated herein is 18.00 x 25 tire which means that its overall diameter is approximately five feet. My invention is intended for successful operation with tires of this size or larger, utilizing an internal pressure of 35 pounds per square inch or less.

The tire 10 illustrated herein is of this character. It will be understood such tires usually have inner tubes, but for clarity the inner tube has been omitted from Figs. 3 and 4.

The endless track 11 comprises a plurality of M-shape elements 12 which I have called herein shoes or cleats. Each element consists essentially of a bar 13 extending crosswise of the tire and adapted to fit into a groove 14 which also extends crosswise of the tire. Preferably, the bar 13 is of V-shape and the grooves 14 are V-shape also corresponding to the shape of the bar. Around the circumference of a tire, there are the same number of bars 13 and grooves 14, one bar fitting into each groove. The V-shape bar 13 forms the central portion of the M-shape element, while the articulating connections between adjacent shoes form the outer legs of the M-shape elements. These outer legs are indicated at 15 and comprise generally parallel upper walls 15a and lower walls 15b connected together by a wall 15c at right angles to the walls 15a and 15b. At the connected end of each outer leg 15, there is provided a hinge lug 16. At the distal end of each outer leg 15 there is provided a hinge lug 17. It will be noted from Fig. 5 that the offset arrangement of each outer leg 15 places the hinge lug 17 of one shoe in alignment with the hinge lug 16 of the adjacent shoe with the outer face of each lug 16 close to and very slightly spaced from the inner face of each lug 17. The lugs 16 and 17 have central aligned openings 16a and 17a respectively for the purpose of receiving a short hinge pin 18. Preferably, but not necessarily, each hinge pin 18 is a drive fit in the opening 16a and turns freely in the opening 17a.

Figure 7:
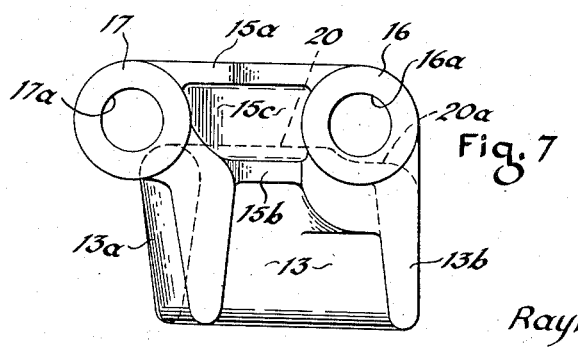
Fig. 7 is an end elevational view of the shoe or cleat of Fig. 6.

Each bar 13 on the side toward the tire tread is preferably provided with a surface curved in cross section as indicated at 19. The top of each bar 13 is also generally flat crosswise of the tire as indicated at 20 in Figs. 3 and 7. This surface is slightly hollowed out or cut away as indicated at 20a, near each hinge lug 16 to give better access to the hinge pins 18.

Figure 5:
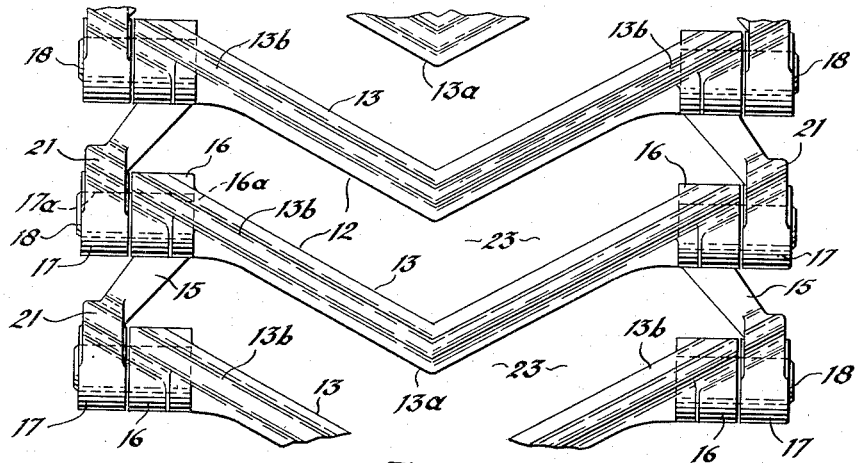
Fig. 5 is a bottom plan view enlarged of the ground-engaging portion of the track of Fig. 1.
Figure 6:
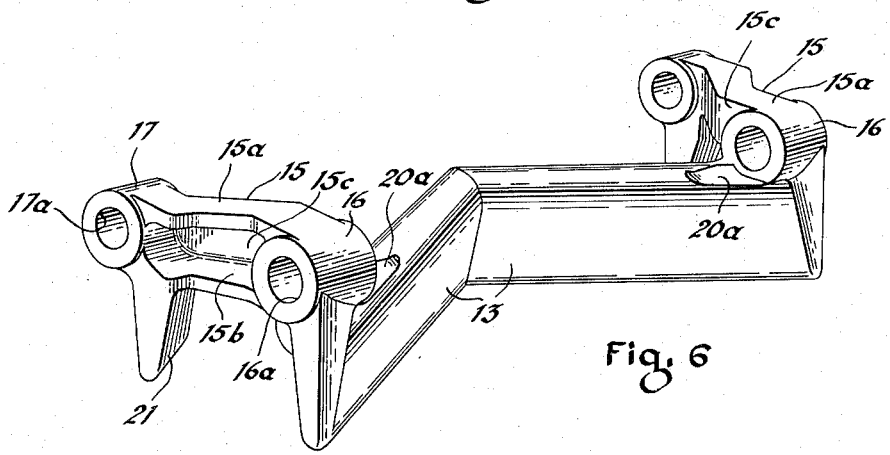

The portion of each bar 13 on the side away from the tire is preferably formed as a grouser to dig into the ground. This grouser is of the same V-shape as the bar 13 generally. It will be noted that the apex 13a of each bar extends close to the center line of the hinge lug 17 of the same shoe or element. The outer ends 13b of each bar and grouser and adjacent the hinge lug 16 of the shoe element. Preferably, but not necessarily, a short spade 21 is provided near the free end of each leg 15 on the side thereof away from the tire and close to the hinge lug 17. Each of these spades 21 is approximately the same lateral width as the hinge lug 17 and so positioned as to be in linear extension of the bar 13 of an adjacent shoe when the shoes are assembled in a track as shown in Fig. 5. In other words, the V-shape of the grouser portion of each bar 13 is continued laterally outwardly by the spades 21 which lie in alignment with V-shape legs of each bar 13. It results from this construction, that the spades 21 aid in the tractive effect of the entire track and at the same time hinder the self-cleaning feature of the track very little, since any material forced outwardly along the V-shape bar 13 is guided further laterally by means of the spades 21 until the material clears the track.

Figures 3, 4:
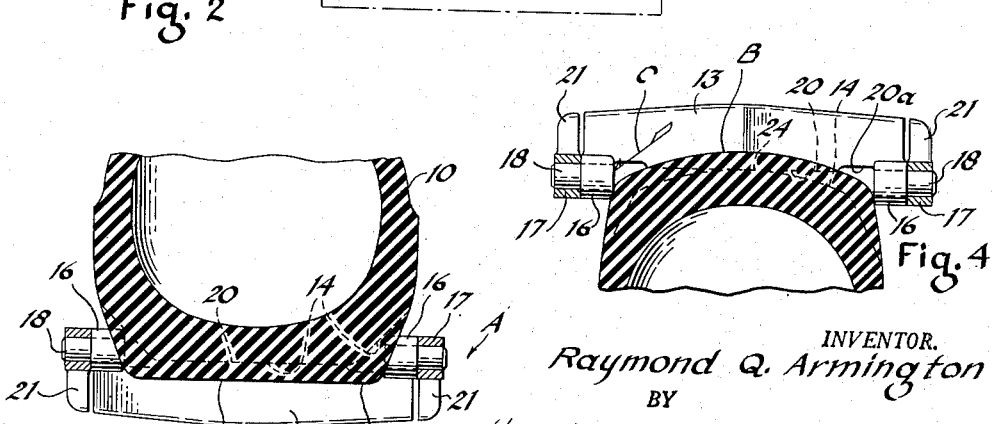
Fig. 3 is enlarged fragmental sectional view taken approximately along the line 3—3 of Fig. 1.
Fig. 4 is enlarged fragmental sectional view similar to Fig. 3 but taken at a non-ground engaging portion of the track and preferably diametrically opposite the section shown in Fig. 3.

It will be noted from Figs. 1 and 3 that the centers of the hinge pins 18 lie radially inside of the outside diameter B of the tire. Referring to Fig. 3, it will be noted that the line A through the centers of pins 18 lies approximately at the radially mid-portion of the carcass tread section of the tire. This causes the movement of the track to conform closely to the tire movement as they both flatten on the ground during rotation of the tire and track combination.

Figure 2:
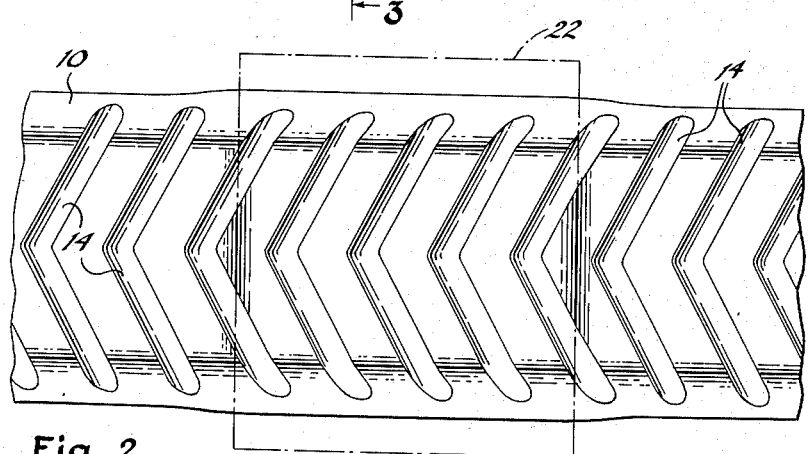
Fig. 2 is an enlarged bottom plan view of the tire of Fig. 1 taken along the line 2—2 of Fig. 1, the portion of the tire flattened on the ground being shown within a broken line box in Fig. 2.

When the complete track is assembled about the tire, the tire is compressed by the track. In other words, the diameter of the tire engaging portions of the bars 13 is less than the diameter of the bottoms of the grooves 14 in the tire tread, when the tire is inflated to normal working pressure. Therefore, when the track is in place on the tire, it draws the tread portion of the tire nearer the center line of the hinge pins as indicated at A. In the case of the 18.00 x 25 tire, previously mentioned, this initial compression of the tire when the track is assembled about it consists of about 4 inches across the diameter of the tire. When the tire flattens under load against the ground as indicated in the broken line box 22 of Fig. 2 and as shown in section in Fig. 3, then the tread of the tire is flattened along the flat surface 20 of each cleat 13 so that the tread of the tire substantially fills the portion of each cleat between the hinge lugs 16. In fact, as clearly seen in Fig. 3, the hinge lugs 16 fit partially into the side portions of the grooves 14 in the tire tread. This aids in holding the tire and track in place so that the tire does not creep within the track. This flattening of the tire at the bottom, causes excess air to flow to the non-ground engaging portions of the tire so that the tire is quite rounded at other places as viewed in section in Fig. 4, thus giving a very limited area of contact between the tire tread and the track around most of the tire.

As viewed in Fig. 4, it is clear that the tread of the tire, as the bottom portion is contacting the ground, together with the arrangement of the surface 20 and the hinge lugs 16 and 17 gives easy access to the hinge pins 18. A tool applied in the direction of the arrow C in Fig. 4 will drive out the hinge pins 18.

It is well known that the grooves 14 in the tire tread will be a little closer together at the ground-engaging portion of the tire as compared with the non-ground-engaged portions thereof. Preferably, I space the hinge pins 18 on centers equivalent to the spacing of the grooves 14 at the ground-engaged portions of the tire as indicated within the box 22 of Fig. 2. This means that the grooves 14 are spaced apart slightly greater distance than the hinge pins 18 at the non-ground-engaging portions of the tire. In these places, deformation of the tire takes place in order to permit the bars 13 to remain seated in their respective grooves 14.

The shoes or cleats in my invention are self-cleaning due to the movement of the rubber of the tire tread in the open spaces 23 between the bars 13. It is believed that this also contributes a better flotation of the load upon the ground since the enveloping effect of the rubber tire on the ground is retained between the bars 13.

The tire and track assembly herein disclosed is very effective for the purpose intended. The articulated track does not interfere with the action of the large tire in floating the weight upon a large area of the ground contacted. At the same time, the metal track provides considerable protection against wear and abrasion and bruising of the tire, which is quite an advantage, especially when working on stony ground. The assembly of the track upon the tire in a manner so as to compress the tire entirely around its periphery, leads to a constant follow-up of the pressure so as to keep the track tight at all times, which is desirable. The reduction of the drivingly engaged area between the tire and track around a large portion of the tire, as indicated at 24 in Fig. 4, when the tire is loaded, reduces the driving action of the tire on the track around the non-ground-engaging portion, but the increased contact at the bottom, due to the tire flattening there under load, more than offsets this disadvantage. In any case, the contact between the tire and track around the non-ground-engaging portion is sufficient to keep the track tight upon the tire at all times.

What I claim is:

1. In combination, a pneumatic tire, said tire comprising a carcass, said carcass having a tread section extending circumferentially about the periphery of said tire, an endless track completely surrounding and engaging the circumference of said tire, said track consisting of a plurality of rigid elements and hinge pin connections between adjacent elements, said connections comprising two short hinge pins provided one each on opposite sides of each element to lie on laterally opposite sides of said tire, and said hinge pins having their respective axes in alignment with each other and passing through substantially the radially mid-portion of the carcass tread section of said tire.

2. The combination of claim 1 wherein said tire is of a construction and under a working pressure such that the tire flattens substantially where it engages the ground under load, said rigid element has a tire-engaging surface the major portion of which is flat, and the major portion of said hinge pins lying on the tire side of a plane through said flat portion of said surface.

3. The combination of claim 2 wherein said tire has evenly spaced grooves extending crosswise of its tread, and the tire engaging portion of each of said elements consists of a rigid bar conforming to and fitting into one of said grooves.

4. The combination of claim 3 wherein the diameter of the tire engaging portions of said elements is less than the root diameter of said grooves when said tire is inflated to normal working pressure.

5. The combination of claim 1 wherein said tire is of a construction and under a working pressure such that the tire flattens substantially where it engages the ground under load, said rigid element has a tire-engaging surface the major portion of which is flat, the major portion of said hinge pins lying on the tire side of a plane through said flat portion of said surface, said hinge pins embraced in bosses on said elements open at the inner ends to expose said hinge pins there, said flat portion of said surfaces being hollowed out near each boss to give better access to said hinge pins, and the air from said flattened portion of said tire rendering the non-ground-engaging portions of said tire sufficiently convex to provide further access to said exposed hinge pins to knock them out.

6. The combination of claim 1 wherein the diameter of the tire-engaging portions of said elements is less than the diameter of the element engaging portions of said tire when said tire is inflated to normal working pressure, whereby said track in place on said tire draws the tread portion of said tire nearer the center line of said hinge pins, and said hinge pins lying at least partly laterally inside of the outermost lateral parts of said tire.

7. In combination, a pneumatic tire, an endless track completely surrounding and engaging the circumference of said tire, said track consisting of a plurality of rigid elements and hinge pin connections between adjacent elements, said connections comprising two short hinge pins provided one each on opposite sides of each element to lie on laterally opposite sides of said tire, and said hinge pins lying at least partly laterally inside of the outermost lateral parts of said tire and lying at least partly radially inside of the outermost circumference of said tire.

8. An element of an endless traction track M-shape in plan, having a V-shape central portion and an outer leg integrally secured to each end of said central portion, the outer surface of said V-shaped central portion being formed as a grouser extending across the entire width of said central portion, said element having hinge pin connections at opposite ends of each of the outer legs, said connections being hollow open-ended bosses offset out of the plane of the V-shape central portion of the M-shape so as to provide access to said open end of said bosses, said bosses having cooperating inner and outer faces.

9. An element of an endless traction track M-shape in plan, having a V-shape central portion and an outer leg integrally secured to each end of said central portion, the outer surface of said V-shaped central portion being formed as a grouser extending across the entire width of said central portion, said element having hinge pin connections at opposite ends of each of the outer legs, said connections being hollow open-ended bosses offset out of the plane of the V-shape central portion of the M-shape so as to provide access to said open end of said bosses, said bosses having cooperating inner and outer faces, said outer legs of said M-shape being inclined so as to place the inner face of the boss at one end of one of said outer legs approximately in line with the outer face of the boss at the other end of the same leg.

10. In combination, a pneumatic tire having evenly spaced V-shaped grooves extending crosswise of its tread, an endless track completely surrounding and engaging the circumference of said tire, said track consisting of a plurality of rigid members and articulating connections between adjacent members, and each member consisting substantially of a one piece bar conforming to and fitting into one of said grooves, said track consisting of M-shape elements, said rigid members comprising the V-shape central portion of said M-shape elements, said articulating connections forming the outer legs of said M-shape elements, said hinge pin connections being provided at opposite ends of each of the outer legs of each M-shape element, said hinge pin connection at the distal end of the outer leg of one element lying laterally outside of and in registration with the hinge pin connection at the junction of the outer leg and the V-shaped central portion of an adjacent element and said hinge pin connection at the connected end of each outer leg of each element being a lug in alignment with the apex of said V-shaped central portion of the adjacent element.

11. In combination, a pneumatic tire having evenly spaced V-shaped grooves extending crosswise of its tread, an endless track completely surrounding and engaging the circumference of said tire, said track consisting of a plurality of rigid members and articulating connections between adjacent members, and each member consisting substantially of a one piece bar conforming to and fitting into one of said grooves, said track consisting of M-shape elements, said rigid members comprising the V-shape central portion of said M-shape elements, said articulating connections forming the outer legs of said M-shape elements, said hinge pin connections being provided at opposite ends of each of the outer legs of each M-shape element, said hinge pin connection at the distal end of the outer leg of one element lying laterally outside of and in registration with the hinge pin connection at the junction of the outer leg and the V-shaped central portion of an adjacent element, a grouser conforming to each bar extending from each bar radially outside of the outermost portion of said tire, and a spade provided on the ground-engaging side of each outer leg of each element in alignment with the grouser of an adjacent element.

12. In combination, a pneumatic tire having evenly spaced V-shaped grooves extending crosswise of its tread, an endless track completely surrounding and engaging the circumference of said tire, said track consisting of a plurality of rigid members and articulating connections between adjacent members, each member consisting substantially of a one piece bar conforming to and fitting into one of said grooves, each of said bars having a grouser portion extending radially outside of the outermost portion of said tire, said track consisting of M-shaped elements, said rigid members comprising the V-shaped central portion of said M-shaped elements, said articulating connections forming the outer legs of said M-shaped elements, said hinge pin connections being provided at opposite ends of each of the outer legs of each M-shaped element, said hinge pin connection at the distal end of the outer leg of one element lying laterally outside of and in registration with the hinge pin connection at the junction of the outer leg and the V-shaped central portion of an adjacent element.

References Cited in the file of this patent

UNITED STATES PATENTS

| | | |
|---|---|---|
| 1,038,235 | Toso | Sept. 10, 1912 |
| 1,053,504 | Harris | Feb. 18, 1918 |
| 1,307,036 | Bretscher | June 17, 1919 |
| 1,413,099 | Cox | Apr. 18, 1922 |
| 1,635,403 | Gilliland | July 12, 1927 |
| 2,046,299 | Armington | June 30, 1936 |
| 2,404,493 | Hait | July 23, 1946 |

FOREIGN PATENTS

| | | |
|---|---|---|
| 536,037 | Great Britain | Apr. 30, 1941 |